United States Patent
Chen et al.

(10) Patent No.: US 10,796,451 B2
(45) Date of Patent: Oct. 6, 2020

(54) OBJECT TRACKING METHOD, DEVICE, AUGMENTED REALITY SYSTEM AND STORAGE MEDIUM

(71) Applicant: Baidu Online Network Technology (Beijing) Co., Ltd, Beijing (CN)

(72) Inventors: Sili Chen, Beijing (CN); Yongjie Zhang, Beijing (CN); Zhaoliang Liu, Beijing (CN); Yuan Lin, Beijing (CN); Hongwu Zhang, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 178 days.

(21) Appl. No.: 16/150,673

(22) Filed: Oct. 3, 2018

(65) Prior Publication Data

US 2019/0304135 A1 Oct. 3, 2019

(30) Foreign Application Priority Data

Mar. 30, 2018 (CN) .......................... 2018 1 0290708

(51) Int. Cl.
*G06T 7/73* (2017.01)
*G06T 7/00* (2017.01)
(Continued)

(52) U.S. Cl.
CPC .................. *G06T 7/75* (2017.01); *G06T 3/40* (2013.01); *G06T 5/002* (2013.01); *G06T 7/97* (2017.01);
(Continued)

(58) Field of Classification Search
None
See application file for complete search history.

(56) References Cited

U.S. PATENT DOCUMENTS 6,940,545 B1 * 9/2005 Ray .................... G06K 9/00228
348/207.99
9,830,503 B1 * 11/2017 Martin ............... G06K 9/00255
(Continued)

FOREIGN PATENT DOCUMENTS

CN 104952063 A 9/2015
CN 105809144 A 7/2016
(Continued)

OTHER PUBLICATIONS

Office Action issued in connection with corresponding Chinese Patent Application No. 2018102907083.
(Continued)

*Primary Examiner* — Mazda Sabouri
(74) *Attorney, Agent, or Firm* — Akerman LLP

(57) ABSTRACT

An object tracking method, device are provided according to the disclosure. The object tracking method includes: acquiring an object image comprising an object; determining a current image with the object from images captured consecutively, according to the object image; calculating a first pose of the object in the current image using a first algorithm, and calculating a second pose of the object in the current image using a second algorithm, wherein the first algorithm has a faster calculating speed than the second algorithm; determining a pose of the object to be the first pose before a calculation of the second pose is completed; and in a case that the calculation of the second pose is completed, calculating a third pose of the object according to the first pose and the second pose; and determining the pose of the object to be the third pose.

9 Claims, 5 Drawing Sheets

(51) Int. Cl.
  *G06T 3/40* (2006.01)
  *G06T 5/00* (2006.01)
  *G06T 19/00* (2011.01)
(52) U.S. Cl.
  CPC .. *G06T 19/006* (2013.01); *G06T 2207/20221* (2013.01)

(56) References Cited

U.S. PATENT DOCUMENTS

| | | | | |
|---|---|---|---|---|
| 2012/0218263 | A1* | 8/2012 | Meier | G06T 19/00 345/419 |
| 2014/0064573 | A1* | 3/2014 | Shuster | G06K 9/00228 382/115 |
| 2014/0168056 | A1* | 6/2014 | Swaminathan | G06F 3/147 345/156 |
| 2019/0026904 | A1* | 1/2019 | Chen | G06T 7/74 |

FOREIGN PATENT DOCUMENTS

| | | |
|---|---|---|
| CN | 104160426 B | 3/2017 |
| CN | 103403736 B | 6/2017 |
| CN | 106843493 A | 6/2017 |
| CN | 106875431 A | 6/2017 |
| CN | 107168619 A | 9/2017 |
| WO | 2016029939 A1 | 3/2016 |

OTHER PUBLICATIONS

Search Report issued in connection with corresponding Chinese Patent Application No. 2018102907083.

Wang, Yue et al., "Model-Based Marker-Less 3D Tracking Approach for Augmented Reality", Journal of Shanghai Jiao Tong University, vol. 52, No. 1, pp. 83-89.

Notification on Grant of the Patent Right for Invention dated Feb. 3, 2019 in connection with corresponding Chinese Patent Application No. 2018102907083.

Search Report dated Jan. 30, 2019 in connection with corresponding Chinese Patent Application No. 2018102907083.

Notification to Go Through Formalities for Registration dated Feb. 3, 2019 in connection with corresponding Chinese Patent Application No. 2018102907083.

* cited by examiner

OBJECT TRACKING METHOD, DEVICE, AUGMENTED REALITY SYSTEM AND STORAGE MEDIUM

CROSS-REFERENCE TO RELATED APPLICATIONS

The present application claims the benefit of priority to Chinese Patent Application No. 201810290708.3, filed before the State Intellectual Property Office on Mar. 30, 2018, and entitled "Object Tracking Method, Device, Augmented Reality System and Storage Medium", which is incorporated in the present application by reference in its entirety

TECHNICAL FIELD

The present disclosure relates to the field of information technology, and in particular, to an object tracking method, device, an augmented reality system, and a computer readable storage medium.

BACKGROUND

There are two 2D tracking algorithms in the related art. One algorithm only relates to perform matching, that is, object matching is performed for each frame captured by a camera. The other algorithm relates to perform tracking and matching, which usually has two synchronized threads, one of which is used for executing the tracking and the other is used for executing the matching. In a case that an image is input, the two threads will start at the same time, and then end at the same time. Finally, results of the two threads are combined to obtain the pose of the object image in the current image.

The above two algorithms have the following drawbacks. For the algorithm only relating to perform matching, the calculating speed is always slow, the pose between the two frames as calculated differ from each other substantially, and this algorithm is not applicable to AR (Augmented Reality) model display. For algorithm relating to perform matching and tracking, due to being limited by performance of a processor at a mobile terminal, either a matching algorithm which has a rapid speed but is less effective is used, leading to a high tracking speed but a low accuracy in pose, or a matching algorithm which has a slow speed but is effective is used, leading to a high accuracy in pose but a low speed.

SUMMARY

An object tracking method, device, an augmented reality system, and a computer readable storage medium are provided according to embodiments of the present disclosure so as to at least solve one or more technical problems in the related art.

In a first aspect, an embodiment of the present disclosure provides an object tracking method, including: acquiring an object image comprising an object; determining a current image with the object from images captured consecutively, according to the object image, wherein the images are consecutively captured by a camera; calculating a first pose of the object in the current image using a first algorithm, and calculating a second pose of the object in the current image using a second algorithm, wherein the first algorithm has a faster calculating speed than the second algorithm; determining a pose of the object to be the first pose before a calculation of the second pose is completed; and in a case that the calculation of the second pose is completed, calculating a third pose of the object according to the first pose and the second pose; and determining the pose of the object to be the third pose In combination with the first aspect, in a first embodiment of the first aspect of the present disclosure, before calculating a first pose of the object in the current image using a first algorithm, the method further comprises: preprocessing the images captured consecutively by converting the images into a grayscale images, down-sampling the images, and/or de-noising the images.

In combination with the first aspect and the first embodiment of the first aspect, in a second embodiment of the first aspect of the present disclosure, the method further includes:
determining an executing cycle in which N images are captured consecutively, and
wherein calculating a first pose of the object in the current image using a first algorithm; and calculating a second pose of the object in the current image using a second algorithm comprises:
in the executing cycle, in response to a reception of the $n^{th}$ frame image of the N images:
in a case of n=1, calculating a first pose of the object in the $n^{th}$ frame image by the first algorithm, and calculating a second pose of the object in the $n^{th}$ frame image by the second algorithm;
in a case that N≥n>1, calculating a first pose of the object in the by the first algorithm; and
wherein the in a case that the calculation of the second pose is completed, calculating a third pose of the object according to the first pose and the second pose; and determining the pose of the object to be the third pose comprises:
in a case that n=N, calculating a first pose of the object in the $n^{th}$ frame image using the first algorithm, calculating a second pose of the object in the first frame image using the second algorithm, and calculating a third pose of the object according to the first pose and the second pose;
wherein N is an integer obtained by calculating a ratio of an executing period of the second algorithm to an executing period of the first algorithm and rounding up the ratio In combination with the second embodiment of the first aspect, in a third embodiment of the first aspect of the present disclosure, said calculating a third pose of the object according to the first pose and the second pose includes: fusing the first poses obtained for the N images to obtain a fused pose; and modifying the fused posed with the second pose to obtain the third pose of the object.

In a second aspect, an embodiment of the present disclosure provides an object tracking device, including: an image acquiring unit, configured for acquiring an object image comprising an object; an image determining unit, configured for determining a current image with the object from images captured consecutively, according to the object image, wherein the images are consecutively captured by a camera; a pose calculating unit, configured for calculating a first pose of the object in the current image using a first algorithm, and calculating a second pose of the object in the current image using a second algorithm, wherein the first algorithm has a faster calculating speed than the second algorithm; and a pose determining unit, configured for determining a pose of the object to be the first pose before a calculation of the second pose is completed, and in a case that the calculation of the second pose is completed, calculating a third pose of the object according to the first pose and the second pose; and determining the pose of the object to be the third pose.

In combination with the second aspect, in a first embodiment of the second aspect, the object tracking device further includes a pre-processing unit, configured for preprocessing the images captured consecutively by converting the images into a grayscale images, down-sampling the images, and/or de-noising the images.

In combination with the second aspect and the first embodiment of the second aspect, in a second embodiment of the second aspect of the present disclosure, the image determining unit is further configured for determining an executing cycle in which N images are captured consecutively; and wherein the pose calculating unit comprises a first calculating subunit, a second calculating subunit, and a third calculating subunit, and is further configured for:

in the executing cycle, in response to a reception of the $n^{th}$ frame image of the N images:

in a case of n=1, calling the first calculating subunit and the second calculating subunit, wherein the first calculating subunit is configured for calculating a first pose of the object in the $n^{th}$ frame image by the first algorithm, and the second calculating subunit is configured for calculating a second pose of the object in the $n^{th}$ frame image by the second algorithm;

in a case that N≥n>1, calling the first calculating subunit, wherein the first calculating subunit is configured for calculating a first pose of the object in the by the first algorithm; and wherein the pose determining unit is further configured for:

in a case that n=N, calling the third calculating subunit, wherein the first calculating subunit is configured for calculating a first pose of the object in the $n^{th}$ frame image using the first algorithm, the second calculating subunit is configured for calculating a second pose of the object in the first frame image using the second algorithm, and the third calculating subunit is configured for calculating a third pose of the object according to the first pose and the second pose;

wherein N is an integer obtained by calculating a ratio of an executing period of the second algorithm to an executing period of the first algorithm and rounding up the ratio.

In combination with the second embodiment of the second aspect, in a third embodiment of the second aspect of the present disclosure, fusing the first poses obtained for the N images to obtain a fused pose; and modifying the fused posed with the second pose to obtain the third pose of the object.

In a possible design, the structure of the object tracking device includes a processor and a memory for storing a program which supports the object tracking device in performing the object tracking method in the above first aspect, the processor being configured to execute the program stored in the memory.

In a third aspect, an embodiment of the present disclosure provides an augmented reality system, including the object tracking device according to any of the above second aspect, and a rendering unit; the rendering unit is configured to render a pose of a model to be displayed according to the determined pose obtained by the object tracking device.

In a fourth aspect, an embodiment of the present disclosure provides an augmented reality system, including: one or more processors; and a storage device, configured to store one or more programs; when the one or more programs are executed by the one or more processors, the one or more processors implements any of the methods included in the first aspect.

In a fifth aspect, an embodiment of the present disclosure provides a computer readable storage medium having a computer program stored thereon that, when executed by a processor, implements any of the methods included in the first aspect.

The above technical solutions have the following advantages or advantageous effects: the accuracy and speed of tracking may be improved, the technical solutions can be applied to track a 2D object image of AR, and in AR, the displayed model can be closely attached to the object image, thereby providing better user experience on AR. In addition, in the embodiments of the present disclosure, hardware is subject to lower requirements and the embodiments can be implemented smoothly even on a low-end machine, thereby lowering a usage threshold and expanding the user group.

The above summary is provided only for illustration, and is not intended to limit the disclosure in any way. In addition to the illustrative aspects, embodiments and features described above, further aspects, embodiments and features of the present disclosure may be readily understood from the following detailed description with reference to the accompanying drawings.

BRIEF DESCRIPTION OF THE DRAWINGS

Unless otherwise specified, identical or similar parts or elements are denoted by identical reference signs throughout several figures of the accompanying drawings. The drawings are not necessarily drawn to scale. It should be understood that these drawings merely illustrate some embodiments of the present disclosure, and should not be construed as limiting the scope of the disclosure.

DETAILED DESCRIPTION

Hereinafter, only some exemplary embodiments are simply described. As can be recognized by those skilled in the art, the described embodiments may be modified in various different ways without departing from the spirit or scope of the present disclosure. Accordingly, the drawings and the description should be considered as illustrative in nature instead of being restrictive.

Figure 1:
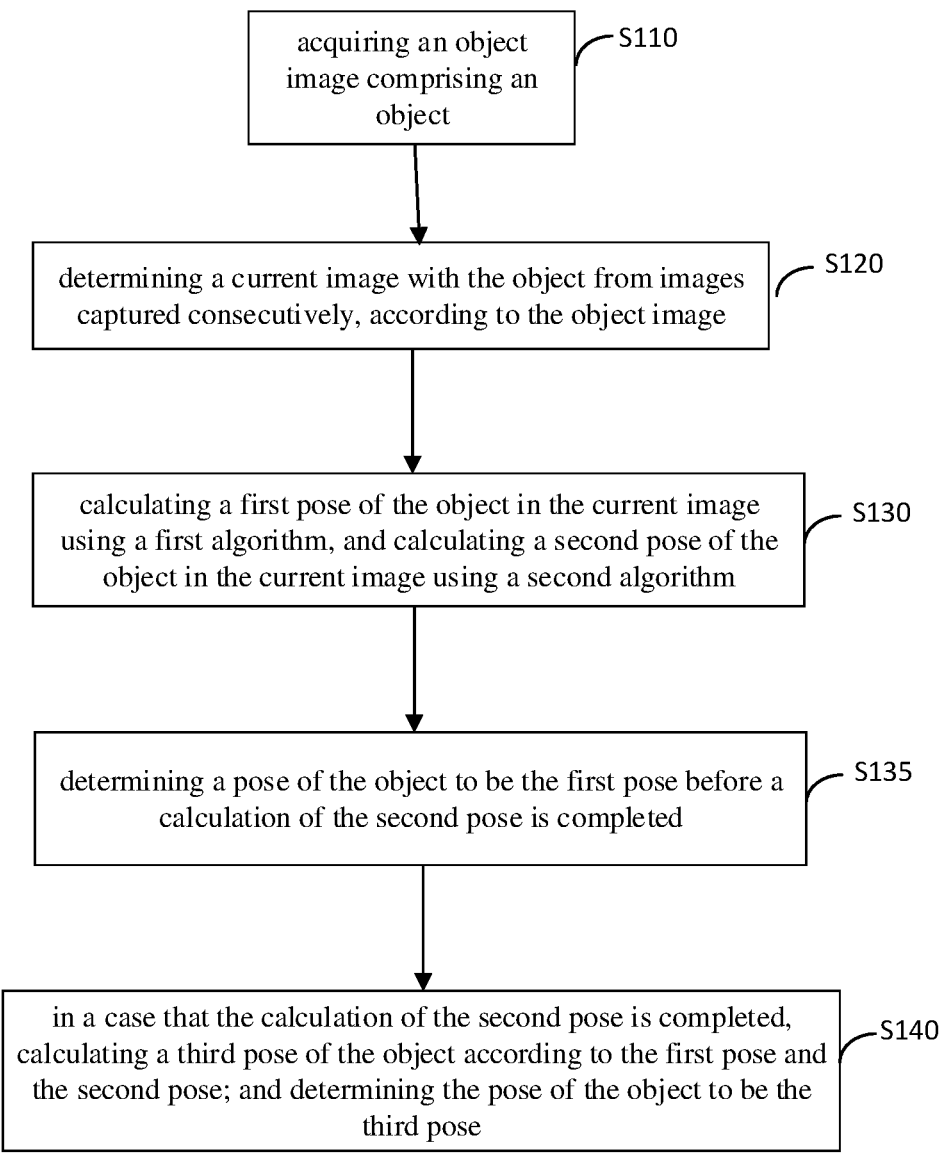
FIG. 1 is an flow chart of an object tracking method according to an embodiment of the present disclosure.

An object tracking method is provided by an embodiment of the disclosure. FIG. 1 is a flow chart of an object tracking method according to an embodiment of the present disclosure. As shown in FIG. 1, the object tracking method of the embodiment of the present disclosure includes: step S110, acquiring an object image comprising an object; step S120, determining a current image with the object from images captured consecutively, according to the object image, wherein the images are consecutively captured by a camera; step S130, calculating a first pose of the object in the current image using a first algorithm, and calculating a second pose of the object in the current image using a second algorithm, wherein the first algorithm has a faster calculating speed than the second algorithm; and step S140, determining a pose of the object to be the first pose before a calculation of the second pose is completed; and in a case that the calculation of the second pose is completed, calculating a third pose of the object according to the first pose and the second pose; and determining the pose of the object to be the third pose.

Object matching is one of methods to search for an object in an image, and the essential principle thereof is to find an object image comprising the object in one frame of image; wherein the object is tracked in a captured image according to the object image. In the method of searching for an object image, the object (i.e., the object image or a feature of the object image) to be tracked is stored in advance, and then upon receiving a captured image, the object is retrieved from the captured image.

Object tracking may be applied to an AR system. A 2D image may be stored in advance as an object image and the object therein serve as an object to be tracked. In the process of object tracking and rendering, firstly, images are consecutively captured by a camera of a mobile phone, and the object is tracked in the images captured consecutively by an algorithm to obtain a pose of the object. Then, a 3D model to be displayed is superimposed on the object image according to the pose so as to render the pose of the 3D model. With the above process, a 3D model is constructed based on a 2D image in the mobile phone, and a user views the 3D model by changing a relative position between the mobile phone and the object.

In the embodiment of the present disclosure, the pose is determined to be the first pose in a case that the second pose of the object in the current image is not obtained, that is, the first pose as calculated is returned to an upper layer application immediately without performing the second algorithm, i.e. without obtaining a second pose. Therefore, it is not necessary to wait for the result of the second algorithm, ensuring a frame rate (running speed) of the algorithm. Moreover, the pose is determined to be the second pose in a case that the second pose of the object image in the current image is obtained, thereby ensuring the accuracy of tracking.

Figure 2:
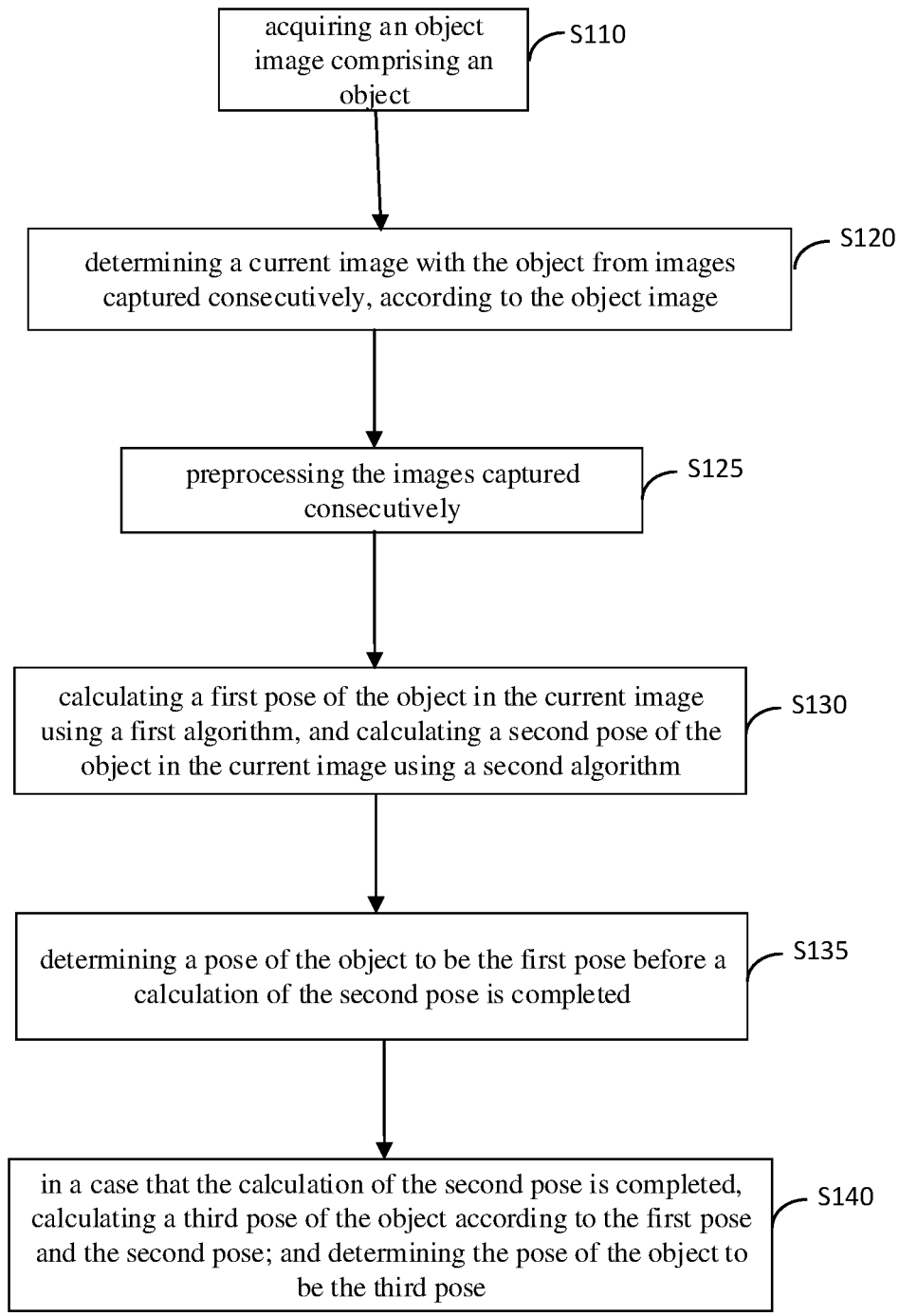
FIG. 2 is a flowchart of a preferred embodiment of the object tracking method provided by the present disclosure.

FIG. 2 is a flowchart showing steps of a preferred embodiment of the object tracking method provided by the present disclosure. As shown in FIG. 2, according to an embodiment of the object tracking method of the present disclosure, before calculating the first pose, the method further includes step S125: preprocessing the images captured consecutively by converting the images into a grayscale images, down-sampling the images, and/or de-noising the images. Specifically, an RGB image is collected by a camera of a mobile phone and converted into a grayscale image. Generally, after converting the RGB image to a YUV image, a Y layer is taken out as the grayscale image. Then, after performing a certain image processing (such as down-sampling, de-noising, etc.), the grayscale image is transmitted to an executing process for executing the first algorithm and the second algorithm, so as to determine a pose of the object.

An RGB color mode is a color standard in the industry, in which various colors are obtained by changing the respective color channels of red (R), green (G), and blue (B) and superimposing them on each other. The RGB represents the included three channels of red, green and blue. In this standard, almost all the colors that may be perceived by human vision are included, and it is one of the most widely used color systems at present. Representation in a YUV color space includes a brightness signal Y and two color difference signals B-Y (i.e., U) and R-Y (i.e., V). It is important to use the YUV color space since in the YUV color space, the brightness signal Y and the chrominance signals U, V are separated.

Figure 3:
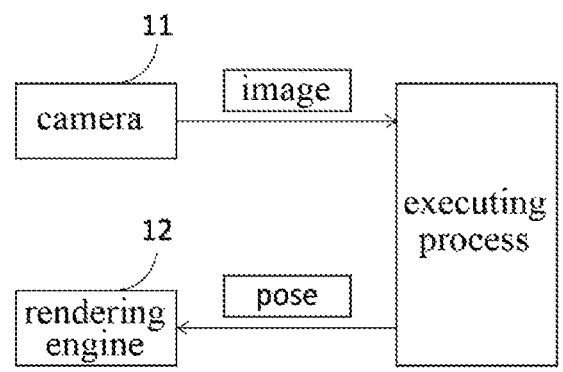
FIG. 3 is a flowchart of object tracking and rendering according to an embodiment of the present disclosure.
Figure 4:
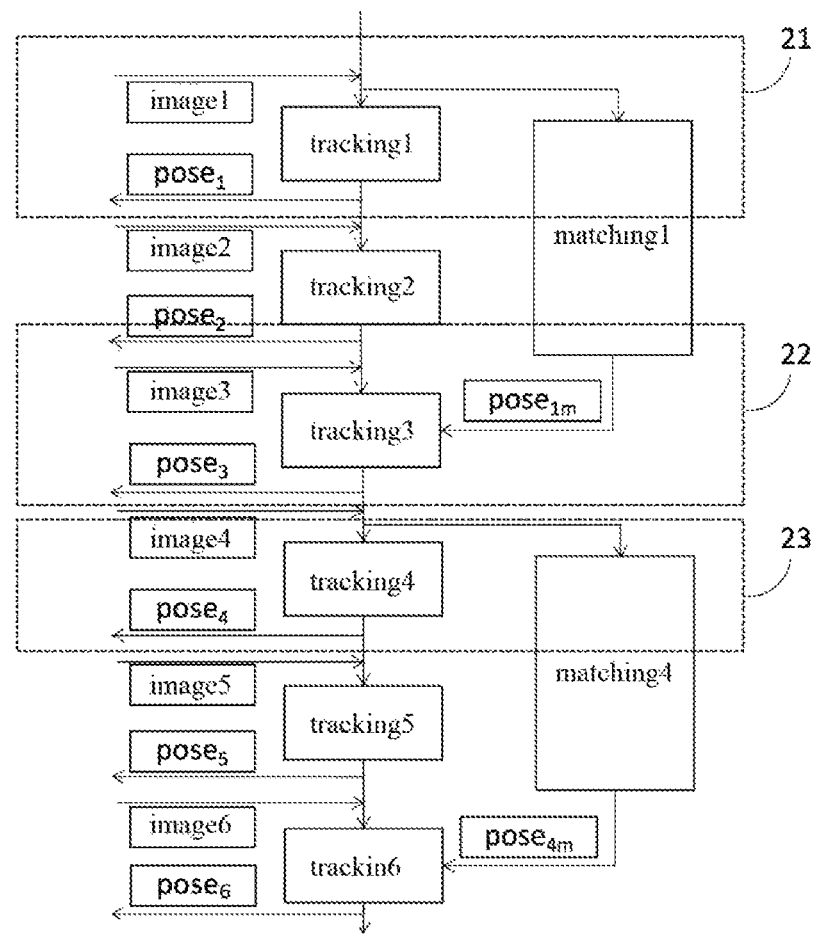
FIG. 4 is a schematic view of an executing process of a preferred embodiment of the object tracking method according to the present disclosure.

FIG. 3 is a flowchart of object tracking and rendering according to an embodiment of the present disclosure. As shown in FIG. 3, a process of 2D object tracking and rendering at a mobile terminal includes:

step 11: collecting an RGB image by a camera of a mobile phone and converting the RGB image into a grayscale image (generally, the RGB is converted into a YUV image, and the a Y layer is taken out as a grayscale image), and transmitting the grayscale image to the executing process after image processing (such as down-sampling, de-noising, etc.); and step 12: calculating, by the executing process (a detailed flowchart of the executing process in FIG. 3 is shown in FIG. 4), the pose (i.e., position and rotation angle) of the object in the current image and transmitting the calculated pose to a rendering unit for rendering a pose of a 3D model. Specifically, a rendering engine may be provided in an operation system, and the 3D model to be displayed is superimposed on the object image according to the pose. A user views the 3D model by changing the relative position between the mobile phone and the object.

According to an embodiment of the object tracking method of the present disclosure, the method further including:

determining an executing cycle in which N images are captured consecutively, wherein calculating a first pose of the object in the current image using a first algorithm; and calculating a second pose of the object in the current image using a second algorithm includes:

in the executing cycle, in response to a reception of the $n^{th}$ frame image of the N images:

in a case of n=1, calculating a first pose of the object in the $n^{th}$ frame image by the first algorithm, and calculating a second pose of the object in the $n^{th}$ frame image by the second algorithm;

in a case that N≥n>1, calculating a first pose of the object in the by the first algorithm; and wherein the in a case that the calculation of the second pose is completed, calculating a third pose of the object according to the first pose and the second pose; and determining the pose of the object to be the third pose comprises:

in a case that n=N, calculating a first pose of the object in the $n^{th}$ frame image using the first algorithm, calculating a second pose of the object in the first frame image using the second algorithm, and calculating a third pose of the object according to the first pose and the second pose;

wherein N is an integer obtained by calculating a ratio of an executing period of the second algorithm to an executing period of the first algorithm and rounding up the ratio N may be obtained by calculating the ratio between the executing period of the second algorithm and that of the first algorithm, and in a case that the ratio is not an integer, the ratio is rounded up, i.e. rounded and then increased by 1. In this way, it is possible to ensure that the second algorithm is executed for one time after the first algorithm is executed for N times in the executing cycle, thereby obtaining a modifying pose, i.e. the second pose, for modifying. In this embodiment, after executing the first algorithm each time, the pose obtained only using the first algorithm is immediately returned to the upper layer application for rendering the pose of the 3D model by the rendering engine, without waiting for the result of the second algorithm, thus ensuring the frame rate (running speed) of the algorithm. Moreover, after executing the second algorithm for one time, the pose obtained by the second algorithm is used for modifying the first pose to obtain a third pose, thereby ensuring the accuracy of tracking.

According to an embodiment of the object tracking method of the present disclosure, the calculating the third of the object in the current image according to the first pose and the modifying pose includes: fusing the first poses which is based on the N images in the executing period to obtain a fused pose, and modifying the fused poses with the modifying pose to obtain the third pose of the object in the current image. The specific modifying method is described in detail with a modifying formula below.

FIG. 4 is a flowchart of an executing process of a preferred embodiment of the object tracking method according to the present disclosure. As shown in FIG. 4, the executing process of the 2D object tracking of the embodiment of the present disclosure includes step 21, step 22, and step 23. Before the step 21, two threads of "tracking" and "matching" are set to execute the first algorithm and the second algorithm respectively. In the second algorithm, the pose of the object in the image is directly detected according to the information in a single picture and the features of the object image. A commonly used second algorithm is an object matching algorithm based on a descriptor such as SURF (Speeded Up Robust Features) and SIFT (Scale-invariant feature transform) or the like and in combination with estimating a projective transformation with RANSAC (Random Sample Consensus). In the first algorithm, according to the position of the object in the frame followed by the current frame, a pose of the object in the current frame is obtained by searching within a small area around a corresponding position in the current frame and comparing with the previous frame. A commonly used first algorithm may be a tracking algorithm, for example, FAST (Features from accelerated segment test) angular point in combination with a binary descriptor.

Step 21 is described in details as follows. The image is processed and the processed image is transmitted to the two threads of "tracking" and "matching". In order to ensure the accuracy of tracking, a matching algorithm with a high accuracy but a slow speed can be used. Since the speed of the tracking algorithm is higher than that of the matching algorithm, the first pose of the object in the current frame may be obtained by the tracking algorithm earlier than by the matching algorithm. In order to ensure the frame rate (running speed) of the executing process, the pose obtained only by the tracking algorithm is immediately transmitted to the upper layer application for the rendering engine to render the pose of the 3D model.

In step 22, assumed that the executing period of the matching algorithm is 2 to 3 times that of the tracking algorithm, which means that within the period in which the tracking algorithm is performed for three times, the matching algorithm is performed for one time, the period in which the tracking algorithm is performed for three times is determined as an executing cycle. In this case, for the frequency of image capturing, reference may be made to the executing frequency of the tracking algorithm, that is, three frames of image (e.g., image 1, image 2, and image 3 as shown in FIG. 4) are captured consecutively in the executing cycle. When the image 1 is transmitted to the tracking thread and the matching thread, the two threads start to execute simultaneously. Here, the tracking of the image 1 performed by the tracking thread is referred to as "tracking 1". Similarly, the tracking of the image 2 performed by the tracking thread is referred to as "tracking 2", and the tracking of the image 3 performed by the tracking thread is referred to as "tracking 3". The matching of image 1 performed by the matching thread is referred to as "matching 1". In the above step 21, the first pose of the image 1 is firstly obtained by "tracking 1" and immediately transmitted to the upper layer application.

Step 22 is described in details as follows. While the obtained first pose transmitted by the "tracking 1", a modifying pose of the object in the image 1 will continue to be calculated by "matching 1" the according to the object matching algorithm. After the image 2 is transmitted to the tracking thread, the tracking thread starts again to calculate the first pose of the object in the image 2. Also, while the obtained first pose transmitted by the "tracking 2", the modifying pose of the object in the image 1 will still be calculated by the "matching 1" according to the object matching algorithm. The calculation by the "matching 1" is not completed until the image 3 is transmitted to the tracking thread. Assume that a tracking pose obtained based on the "tracking 1" to "track 3" is $pose_{3c}$, then the tracking pose transmitted to the rendering engine now is ready to be modified with the modifying pose obtained by the matching. After obtaining the third pose $pose_3$ obtained by modifying, this tracking pose is transmitted to the rendering engine for model rendering. The modifying formula used herein is:

$$pose_3 = pose_{3c} * pose_1' * pose_{1m}$$

wherein "pose" represents a pose matrix, and an element of the pose matrix is a position or rotation angle;

$pose_1'$ is an inverse matrix of $pose_1$, $pose_1$ is the pose of the object calculated by "tracking 1" and transmitted to the upper layer application by the tracking algorithm, $pose_2$ is the pose of the object calculated by "tracking 2" and transmitted to the upper layer application by the tracking algorithm, and $pose_3$ is the pose of the object calculated by "tracking 3" and transmitted to the upper layer application by the tracking algorithm;

$pose_{1m}$ is the second pose (modifying pose) of the object in the image 1 calculated by the "matching 1";

$pose_1' * pose_{1m}$ is a compensation term for compensating for a accumulated error of the tracking due to noise or insufficient number of digits reserved for the decimal places of the data or the like;

$pose_3$ is the third obtained by modifying;

$pose_{3c}$ is a tracking pose matrix obtained on the basis of the first poses obtained by tracking 1, tracking 2, and tracking 3, that is, a tracking pose matrix obtained by fusing $pose_1$, $pose_2$, and $pose_3$.

Specifically, $pose_{3c}$ is obtained with the following formula:

$$pose_{3c} = pose_{\Delta 3c2} * pose_{\Delta 21} * pose_1$$

wherein $pose_{\Delta 21}$ is a relative pose of the pose of the object in the image 2 calculated by the tracking algorithm relative to the object in the image 1; and $pose_{\Delta 3c2}$ is a relative pose of the pose of the object in the image 3 calculated by the tracking algorithm relative to the object in the image 2.

The above processing on image 1, image 2, and image 3 is performed in the executing cycle. After the executing cycle ends, a next executing cycle will begin, and in the next executing cycle, newly obtained images (image 4, image 5, and image 6) will be processed.

In step 23, the newly obtained images (image 4, image 5, and image 6) are transmitted to the executing process. At this point, the tracking thread and matching thread are both idle, so the two threads start simultaneously, and "tracking 4", "tracking 5", "tracking 6" and "matching 4" are performed to the newly obtained images similar to those performed to the image 1, image 2, and image 3. Corresponding results obtained are pose$_4$, pose$_5$, pose$_{4m}$, and pose$_6$, wherein pose$_4$, pose$_5$, and pose$_6$ are the results transmitted to the upper layer application.

In step 21 of FIG. 4, the first pose obtained using the tracking algorithm for image 1 is immediately transmitted to the upper layer application for the rendering engine to render the pose of the 3D model. That is, as soon as the image 1 is obtained, a first pose of the object is obtained by calculating using the tracking algorithm, and the first pose as obtained will be immediately transmitted to the upper layer application without waiting for the result of the matching algorithm, thus ensuring the frame rate (running speed) of the algorithm.

Similarly, after the image 2 is obtained, a first pose is also calculated using the tracking algorithm for image 2 and transmitted to the upper layer application, without waiting for the result of the matching algorithm.

After the image 3 is obtained, a pose is calculated using the tracking algorithm for image 3, and a second of the target in the image 1 has been calculated by the matching algorithm. At this point, the tracking pose matrixes obtained on the basis of the tracking 1, tracking 2, and tracking 3 are fused together, and modified with the second pose obtained by the matching (using the modifying formula in the above step 22) to obtain a third pose, thereby ensuring the tracking precision.

To sum up, the method of the present disclosure effectively improves the accuracy and speed of the tracking.

Figure 5:
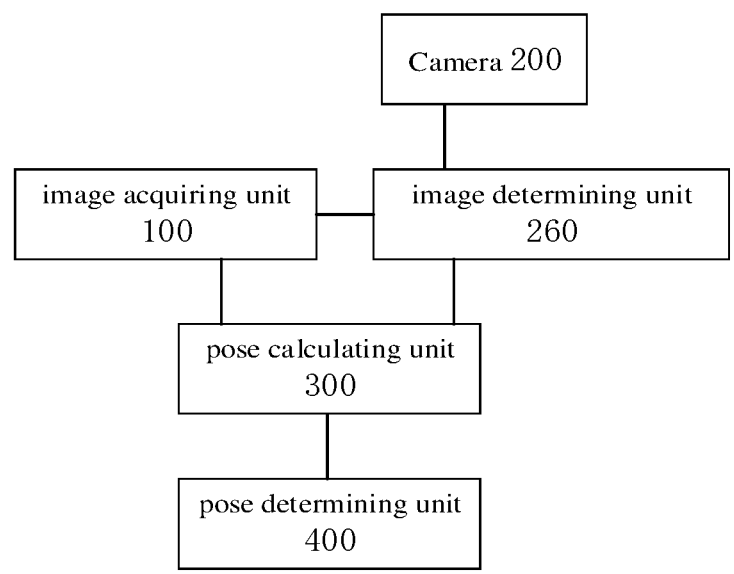
FIG. 5 is a schematic structural diagram of an object tracking device according to an embodiment of the present disclosure.

In another aspect, an embodiment of the present disclosure provides an object tracking device. FIG. 5 is an schematic structural diagram of an object tracking device according to an embodiment of the present disclosure. As shown in FIG. 5, the object tracking device of the embodiment of the present disclosure includes: an image acquiring unit 100, configured for acquiring an object image comprising an object; an image determining unit 260, configured for determining a current image with the object from images captured consecutively, according to the object image, wherein the images are consecutively captured by a camera 200; a pose calculating unit 300, configured for calculating a first pose of the object in the current image using a first algorithm, and calculating a second pose of the object in the current image using a second algorithm, wherein the first algorithm has a faster calculating speed than the second algorithm; and a pose determining unit 400, configured for determining a pose of the object to be the first pose before a calculation of the second pose is completed, and in a case that the calculation of the second pose is completed, calculating a third pose of the object according to the first pose and the second pose; and determining the pose of the object to be the third pose.

Figure 6:
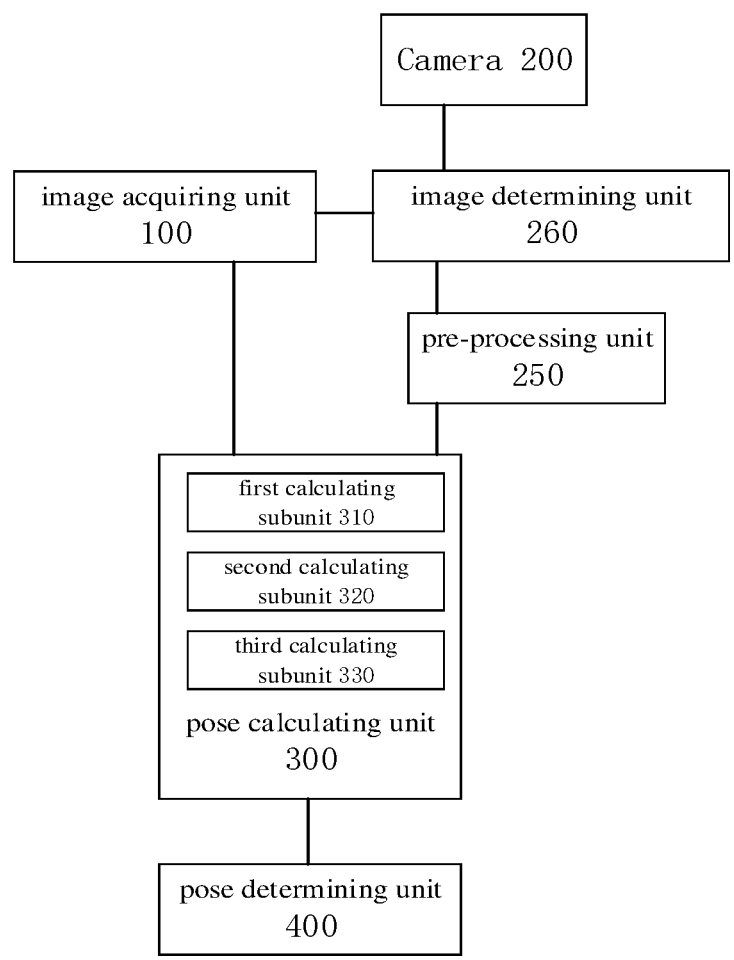
FIG. 6 is a schematic structural diagram of a preferred embodiment of the object tracking device according to the present disclosure.

FIG. 6 is a schematic structural diagram of a preferred embodiment of the object tracking device according to the present disclosure. As shown in FIG. 6, an embodiment of the object tracking device according to the present disclosure further includes a pre-processing unit 250, configured for preprocessing the images captured consecutively by converting the images into a grayscale images, down-sampling the images, and/or de-noising the images.

According to an embodiment of the object tracking device of the present disclosure, the image determining unit 250 is further configured for determining an executing cycle in which N images are captured consecutively; and wherein the pose calculating unit 300 comprises a first calculating subunit 310, a second calculating subunit 320, and a third calculating subunit 330, and is further configured for:

in the executing cycle, in response to a reception of the n$^{th}$ frame image of the N images:

in a case of n=1, calling the first calculating subunit and the second calculating subunit, wherein the first calculating subunit is configured for calculating a first pose of the object in the n$^{th}$ frame image by the first algorithm, and the second calculating subunit is configured for calculating a second pose of the object in the n$^{th}$ frame image by the second algorithm;

in a case that N≥n>1, calling the first calculating subunit, wherein the first calculating subunit is configured for calculating a first pose of the object in the by the first algorithm; and wherein the pose determining unit is further configured for:

in a case that n=N, calling the third calculating subunit, wherein the first calculating subunit is configured for calculating a first pose of the object in the n$^{th}$ frame image using the first algorithm, the second calculating subunit is configured for calculating a second pose of the object in the first frame image using the second algorithm, and the third calculating subunit is configured for calculating a third pose of the object according to the first pose and the second pose;

wherein N is an integer obtained by calculating a ratio of an executing period of the second algorithm to an executing period of the first algorithm and rounding up the ratio.

According to an embodiment of the object tracking device of the present disclosure, the third calculating subunit 330 is further configured for fusing the first poses obtained for the N images to obtain a fused pose; and modifying the fused posed with the second pose to obtain the third pose of the object.

In a possible design, the structure of the object tracking device includes a processor and a memory for storing a program which supports the object tracking device in performing the object tracking method described above, the processor being configured to execute the program stored in the memory.

In another aspect, an embodiment of the present disclosure provides an augmented reality system, including the object tracking device according to any of the above described aspects, and a rendering unit; the rendering unit is configured to render a pose of a model to be displayed according to the determined pose obtained by the object tracking device. Referring to FIG. 3, in a specific embodiment, a rendering engine is provided in the system, and a pose of the object in the current image calculated by the executing process is transmitted to the rendering engine for rendering a pose of a 3D model.

In further another aspect, an embodiment of the present disclosure provides an augmented reality system, including: one or more processors; and a storage device, configured to store one or more programs; when the one or more programs are executed by the one or more processors, the one or more processors implements any of the above described object tracking methods.

In still further another aspect, an embodiment of the present disclosure provides a computer readable storage medium having a computer program stored thereon that, when executed by a processor, implements any of the above described object tracking methods.

The above technical solutions have the following advantages or advantageous effects: the accuracy and speed of tracking may be improved, the technical solutions can be applied to track a 2D object image of AR, and in AR, the displayed model can be closely attached to the object image, thereby providing better user experience on AR. In addition, in the embodiments of the present disclosure, hardware is subject to lower requirements and the embodiments can be implemented smoothly even on a low-end machine, thereby lowering a usage threshold and expanding the user group.

In the present specification, the description referring to the terms "one embodiment", "some embodiments", "an example", "a specific example", or "some examples" or the like means that the specific features, structures, materials, or characteristics described in connection with the embodiment or example are contained in at least one embodiment or example of the disclosure. Moreover, the specific features, structures, materials, or characteristics described may be combined in a suitable manner in any one or more embodiments or examples. In addition, various embodiments or examples described in the specification as well as features of different embodiments or examples may be united and combined by those skilled in the art, as long as they do not contradict with each other.

Furthermore, terms "first" and "second" are used for descriptive purposes only, and are not to be construed as indicating or implying relative importance or implicitly indicating the number of recited technical features. Thus, a feature defined with "first" and "second" may include at least one said feature, either explicitly or implicitly. In the description of the present disclosure, the meaning of "a plurality" is two or more than two, unless otherwise explicitly or specifically indicated.

Any process or method described in the flowcharts or described otherwise herein may be construed as representing a module, segment or portion including codes for executing one or more executable instructions for implementing a particular logical function or process steps. The scope of the preferred embodiments of the present disclosure includes additional implementations in which functions may be implemented in an order that is not shown or discussed, including in a substantially concurrent manner or in a reverse order based on the functions involved. All these should be understood by those skilled in the art to which the embodiments of the present disclosure belong.

The logics and/or steps represented in the flowchart or otherwise described herein for example may be considered as an ordered list of executable instructions for implementing logical functions. They can be specifically embodied in any computer-readable medium for use by an instruction execution system, apparatus or device (e.g., a computer-based system, a system including a processor, or another system that can obtain instructions from the instruction execution system, apparatus or device and execute these instructions) or for use in conjunction with the instruction execution system, apparatus or device. For the purposes of the present specification, "computer-readable medium" can be any means that can contain, store, communicate, propagate or transmit programs for use by an instruction execution system, apparatus or device or for use in conjunction with the instruction execution system, apparatus or device. More specific examples (non-exhaustive list) of computer-readable storage medium at least include: electrical connection parts (electronic devices) having one or more wires, portable computer disk cartridges (magnetic devices), random access memory (RAM), read only memory (ROM), erasable programmable read-only memory (EPROM or flash memory), fiber optic devices, and portable read only memory (CDROM). In addition, the computer-readable storage medium may even be a paper or other suitable medium on which the programs can be printed. This is because for example the paper or other medium can be optically scanned, followed by editing, interpretation or, if necessary, other suitable ways of processing so as to obtain the programs electronically, which are then stored in a computer memory.

It should be understood that individual portions of the present disclosure may be implemented in the form of hardware, software, firmware, or a combination thereof. In the above embodiments, a plurality of steps or methods may be implemented using software or firmware stored in a memory and executed by a suitable instruction execution system. For example, if they are implemented in hardware, as in another embodiment, any one or a combination of the following techniques known in the art may be used: discrete logic circuits having logic gate circuits for implementing logic functions on data signals, application-specific integrated circuits having suitable combined logic gate circuits, programmable gate arrays (PGA), field programmable gate arrays (FPGA), etc.

Those skilled in the art may understand that all or part of the steps carried in the method of the foregoing embodiments may be implemented by using a program to instruct the relevant hardware, and the program may be stored in a computer-readable storage medium. When executed, the program includes one or a combination of the steps in the method embodiments. The device embodiments correspond to the method embodiments, and a description of the device embodiments is therefore relatively brief. For relevant description, reference may be made to the method embodiments.

In addition, individual functional units in various embodiments of the present disclosure may be integrated in one processing module, or individual units may also exist physically and independently, or two or more units may also be integrated in one module. The above integrated module can be implemented in the form of hardware or in the form of a software functional module. The integrated module may also be stored in a computer-readable storage medium if it is implemented in the form of a software functional module and sold or used as a stand-alone product. The storage medium may be a read-only memory, a magnetic disk or an optical disk, etc.

The above description only relates to specific embodiments of the present disclosure, but the scope of protection of the present disclosure is not limited thereto, and any of those skilled in the art can readily contemplate various changes or replacements within the technical scope of the present disclosure. All these changes or replacements should be covered by the scope of protection of the present disclosure. Therefore, the scope of protection of the present disclosure should be determined by the scope of the appended claims.

What is claimed is:

1. An object tracking method, comprising:
acquiring an object image comprising an object;
determining a current image with the object from images captured consecutively, according to the object image, wherein the images are consecutively captured by a camera;
calculating a first pose of the object in the current image using a first algorithm, and calculating a second pose of the object in the current image using a second algorithm, wherein the first algorithm has a faster calculating speed than the second algorithm;
determining a pose of the object to be the first pose before a calculation of the second pose is completed; and
in a case that the calculation of the second pose is completed, calculating a third pose of the object according to the first pose and the second pose; and determining the pose of the object to be the third pose,
the method further comprising:
determining an executing cycle in which N images are captured consecutively, and
wherein calculating a first pose of the object in the current image using a first algorithm;
and calculating a second pose of the object in the current image using a second algorithm comprises:
in the executing cycle, in response to a reception of the $n^{th}$ frame image of the N images:
in a case of n=1, calculating a first pose of the object in the $n^{th}$ frame image by the first algorithm, and calculating a second pose of the object in the $n^{th}$ frame image by the second algorithm;
in a case that N≥n>1, calculating a first pose of the object in the by the first algorithm; and
wherein the in a case that the calculation of the second pose is completed, calculating a third pose of the object according to the first pose and the second pose; and determining the pose of the object to be the third pose comprises:
in a case that n=N, calculating a first pose of the object in the $n^{th}$ frame image using the first algorithm, calculating a second pose of the object in the first frame image using the second algorithm, and calculating a third pose of the object according to the first pose and the second pose;
wherein N is an integer obtained by calculating a ratio of an executing period of the second algorithm to an executing period of the first algorithm and rounding up the ratio.

2. The method of claim 1, wherein before calculating a first pose of the object in the current image using a first algorithm, the method further comprises:
preprocessing the images captured consecutively by converting the images into a grayscale images, down-sampling the images, and/or de-noising the images.

3. The method of claim 1, wherein the calculating a third pose of the object according to the first pose and the second pose comprises:
fusing the first poses obtained for the N images to obtain a fused pose; and modifying the fused posed with the second pose to obtain the third pose of the object.

4. An object tracking device, comprising:
an image acquiring unit, configured for acquiring an object image comprising an object;
an image determining unit, configured for determining a current image with the object from images captured consecutively, according to the object image, wherein the images are consecutively captured by a camera;
a pose calculating unit, configured for calculating a first pose of the object in the current image using a first algorithm, and calculating a second pose of the object in the current image using a second algorithm, wherein the first algorithm has a faster calculating speed than the second algorithm; and
a pose determining unit, configured for determining a pose of the object to be the first pose before a calculation of the second pose is completed, and in a case that the calculation of the second pose is completed, calculating a third pose of the object according to the first pose and the second pose; and determining the pose of the object to be the third pose,
wherein the image determining unit is further configured for determining an executing cycle in which N images are captured consecutively; and
wherein the pose calculating unit comprises a first calculating subunit, a second calculating subunit, and a third calculating subunit, and is further configured for:
in the executing cycle, in response to a reception of the $n^{th}$ frame image of the N images:
in a case of n=1, calling the first calculating subunit and the second calculating subunit, wherein the first calculating subunit is configured for calculating a first pose of the object in the $n^{th}$ frame image by the first algorithm, and the second calculating subunit is configured for calculating a second pose of the object in the $n^{th}$ frame image by the second algorithm;
in a case that N≥n>1, calling the first calculating subunit, wherein the first calculating subunit is configured for calculating a first pose of the object in the by the first algorithm; and
wherein the pose determining unit is further configured for:
in a case that n=N, calling the third calculating subunit, wherein the first calculating subunit is configured for calculating a first pose of the object in the $n^{th}$ frame image using the first algorithm, the second calculating subunit is configured for calculating a second pose of the object in the first frame image using the second algorithm, and the third calculating subunit is configured for calculating a third pose of the object according to the first pose and the second pose;
wherein N is an integer obtained by calculating a ratio of an executing period of the second algorithm to an executing period of the first algorithm and rounding up the ratio.

5. The device of claim 4, further comprising a preprocessing unit, configured for preprocessing the images captured consecutively by converting the images into a grayscale images, down-sampling the images, and/or de-noising the images.

6. The device of claim 4, wherein the third calculating subunit is further configured for fusing the first poses obtained for the N images to obtain a fused pose; and modifying the fused posed with the second pose to obtain the third pose of the object.

7. An augmented reality system, comprising the object tracking device of claim 4, and a rendering unit;
the rendering unit is configured to render a pose of a model to be displayed according to the pose determined by the object tracking device.

8. An augmented reality system, comprising:
one or more processors; and
a storage device, configured to store one or more programs;
when the one or more programs are executed by the one or more processors, the one or more processors implements the method of claim 1.

9. A non-transitory computer readable storage medium having a computer program stored thereon that, when executed by a processor, implements the method of claim 1.

* * * * *